US006285037B1

(12) United States Patent
Koyama et al.

(10) Patent No.: US 6,285,037 B1
(45) Date of Patent: Sep. 4, 2001

(54) LIQUID DROP DETECTION METHOD AND APPARATUS THEREFOR

(75) Inventors: Tadashi Koyama; Shuhei Tanaka; Keiji Tsunetomo, all of Osaki (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/377,745

(22) Filed: Aug. 20, 1999

(30) Foreign Application Priority Data

Aug. 21, 1998 (JP) .................................................. 10-235184

(51) Int. Cl.[7] .................................................. G01N 15/06
(52) U.S. Cl. ...................................... 250/574; 250/227.25
(58) Field of Search .............................. 250/227.25, 216, 250/222.2, 221, 573, 574, 341.8; 318/483; 340/602

(56) References Cited

U.S. PATENT DOCUMENTS 5,181,645 * 1/1993 Yoshimi et al. .................. 250/203.4

FOREIGN PATENT DOCUMENTS 10-268066    9/1998 (JP) .

* cited by examiner

*Primary Examiner*—Que T. Le
(74) *Attorney, Agent, or Firm*—Pillsbury Winthrop LLP

(57) ABSTRACT

In a method for detecting liquid drops adhering upon a front windshield with superior sensitivity but without obstructing drivers, a light beam emitted from a light emitting element 4 is guided into a light guiding body 7, and after undergoing total internal reflection within light guiding body 7, it is guided into a front windshield G. The light guided into the front windshield G is received by a light receiving element 5 after repeated total internal reflections within the front windshield G. In this instance, when raindrops adhere on the outside surface of the front windshield G and the adhering points are at the total internal reflection points of the light mentioned above, then the light beam guided into the front windshield G passes through and goes out from the windshield G without undergoing total internal reflection therein. As the result of this, the amount of the light beam received by the light receiving element decreases, thereby enabling detection of adhesion of raindrops based thereon, so as to output a signal for driving a wiper equipment or the like.

3 Claims, 3 Drawing Sheets

LIQUID DROP DETECTION METHOD AND APPARATUS THEREFOR

BACKGROUND OF THE INVENTION

1. Field of the Invention

Figure 1:
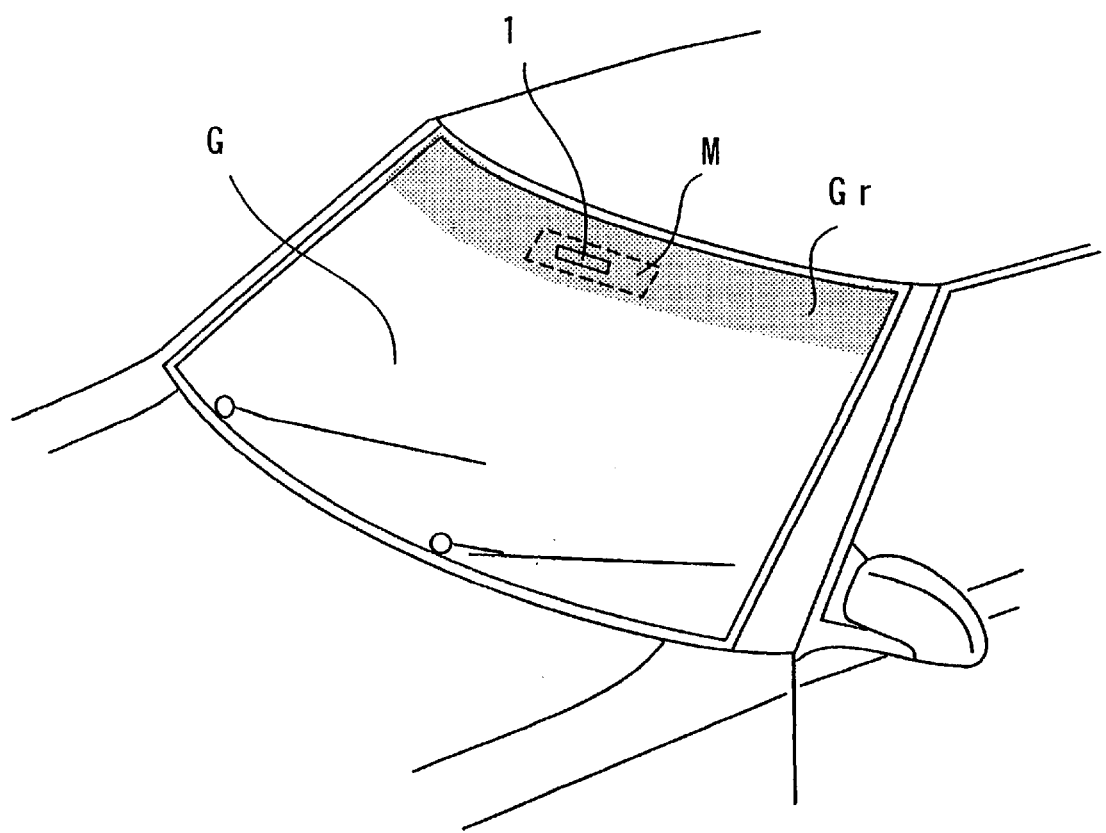

The present invention relates to a liquid drop detection method and an apparatus therefor, for detecting liquid such as drops of rain adhering upon a front windshield of an automobile, so as to drive a wiper and so on corresponding thereto.

2. Description of Prior Art

An optical type liquid drop detector (a rain sensor) was already proposed and disclosed in Japanese Laid-Open Patent No. Hei 9-68616 (1997) filed by the inventors of the present invention.

This detector has a construction wherein a light emitting element and a light receiving element are attached on one side surface of a glass plate, and wherein a light beam emitted from the light emitting element is guided into the glass plate through a light guiding body and enters into a light receiving element after undergoing total internal reflection within the glass plate. When such the light beam undergoing total internal reflection within the glass plate enters into the light receiving element, it is reduced in an amount (intensity) by loss from the total internal reflection if water drops are adhered at surface points where the total internal reflection is taking place, thereby enabling detection of the adhesion of water drops on the surface of the glass plate on the basis of the reduced amount of received light.

SUMMARY OF THE INVENTION

When applying the liquid drop detect or as mentioned above to an automobile, it must be attached on an interior side surface of the front windshield. In such a case, it is necessary that the attachment of the liquid drop detector does not obstruct driving and does not decrease the sensitivity in detection thereof. However, such liquid drop detector as mentioned above has been applied only for the purpose of trial, wherein incomplete consideration was paid to the details of applying it to an automobile practically.

According to the present invention, for dissolving the drawback mentioned above, there is provided a liquid drop detecting method, comprising steps of:

introducing a light beam emitted from a light emitting means into a glass plate; and detecting presence of liquid drops adhering upon said glass plate by detecting the light beam experiencing total internal reflection on both inner surfaces within said glass plate, wherein a wavelength of the light beam emitted from said light emitting means is selected to be from 700 nm to 780 nm.

Further, according to the present invention, there is provided a liquid drop detecting apparatus, comprising:

light emitting means for emitting a light beam;

a glass plate, into which the light beams emitted from said light emitting means is introduced; and light receiving means for detecting the light beam experiencing total internal reflection on both inner surfaces within said glass plate, wherein a wavelength of the light beam emitted from said light emitting means is selected to be from 700 nm to 780 nm.

The reason for using light being 700 nm to 780 nm in wavelength thereof for detection is that, first of all, as shown in TABLE 1 below, comparison luminosity factor increases gradually if the wavelength is shorter than 700 nm, i.e., the detection light can be easily recognized by the naked eye, thereby introducing obstruction or distraction.

TABLE 1

| Wavelength (nm) | Standard Comparison Luminosity Factor |
| --- | --- |
| 500 | 0.323 |
| 510 | 0.503 |
| 520 | 0.710 |
| 530 | 0.862 |
| 540 | 0.954 |
| 550 | 0.995 |
| 560 | 0.995 |
| 570 | 0.962 |
| 580 | 0.870 |
| 590 | 0.757 |
| 600 | 0.631 |
| 610 | 0.503 |
| 620 | 0.361 |
| 630 | 0.265 |
| 640 | 0.175 |
| 650 | 0.107 |
| 660 | 0.061 |
| 670 | 0.032 |
| 680 | 0.017 |
| 690 | 0.0082 |
| 700 | 0.0042 |
| 710 | 0.0021 |
| 720 | 0.00105 |
| 730 | 0.00052 |
| 740 | 0.00025 |
| 750 | 0.00012 |
| 760 | 0.00006 |

The front windshield presently in common use contains a relatively large amount of iron components for the purpose of cutting down ultraviolet rays and for absorbing heat rays thereof. Since the absorbing region of the iron components lies from 900 nm to 1,000 nm, then the absorption comes to be larger in an infrared region exceeding 780 nm and the luminosity factor at such wavelengths is decreased. In particular, if trying to improve reliability in detection by means of the number of measuring points (i.e., the total internal reflection points) of the liquid drop detector, the number of reflections must be equal or more than 2 times. However, the larger the number of total internal reflections, the more the attenuated light beam is weakened, and thus the reliability is decreased.

Figure 3:
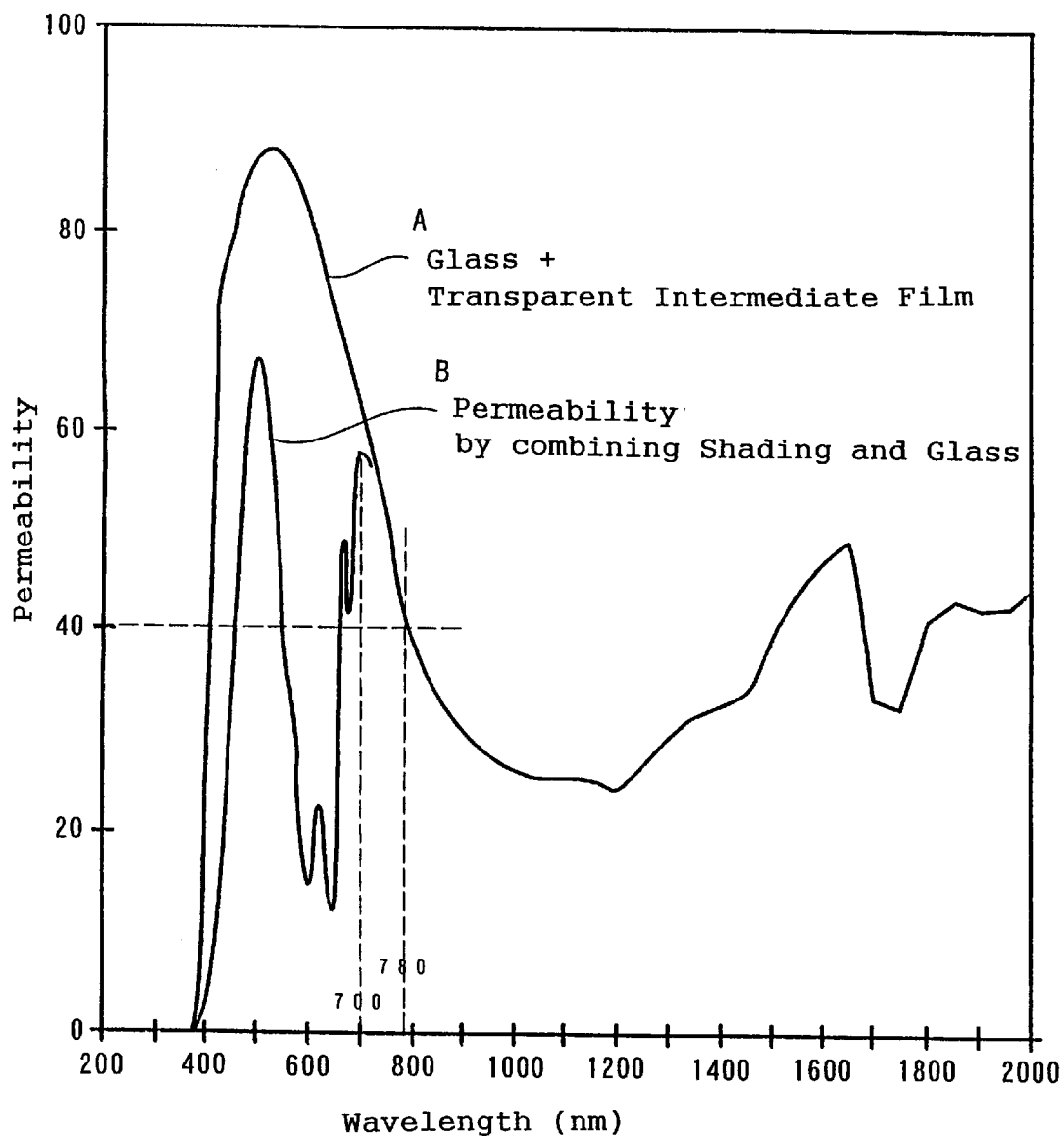

Also, most of the recent front windshields for automobiles have shading in an upper portion thereof for the purpose of protection from blinding or dazzling light. A line A in FIG. 3 shows the relationship between wavelength and permeability of the front shield for automobiles, which includes an intermediate film of polyvinyl butyral, while a line B shows the relationship between wavelength and permeability of the same front shield for automobiles, in particular in a shaded portion at the top region of the windshield.

From the graph, it can be seen that the light rays from 470 nm to 700 nm in wavelength are selectively absorbed in the shaded portion. If the liquid drop detector is provided on the interior side of the front windshield being formed with the shading in the portion of the intermediate film and as the detection light of the detector is used the light being from 470 nm to 700 nm in wavelength, the detection light is absorbed by the shaded portion, therefore the luminosity factor is decreased greatly.

Therefore, according to the present invention, the light from 700 nm to 780 nm in wavelength is used, which lies in a region of visible light but is small in the luminosity factor thereof, therefore being unlikely to cause obstruction or distraction, and is also small in a level of absorption into the glass.

BRIEF DESCRIPTION OF THE DRAWING(S)

Figure 2:
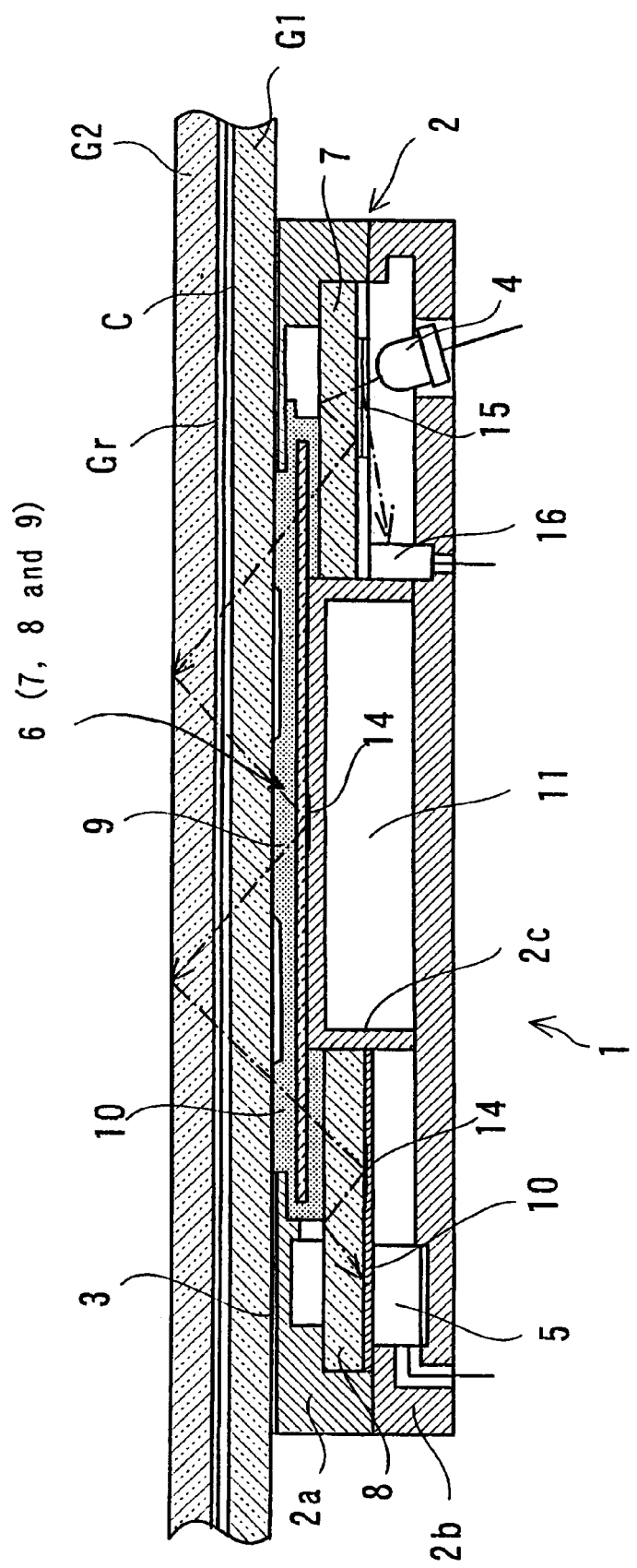

FIG. 1 shows a perspective view of an embodiment in which the liquid drop detector according to the present invention is plied to an automobile;

FIG. 2 shows a cross-sectional view of the liquid drop detector according to the present invention under the condition of being attached on a front windshield of the automobile; and FIG. 3 is a graph showing a relationship between permeability and wavelength of the light beam in cases where a glass plate and a transparent intermediate film are combined and a where shading is further provided on the glass plate.

DETAILED DESCRIPTION OF PREFERRED EMBODIMENT(S)

Hereinafter, embodiments according to the present invention will be fully explained by referring to the attached drawings, wherein FIG. 1 shows the perspective view of an embodiment in which the liquid drop detector according to the present invention is applied to an automobile; and FIG. 2 shows the cross-sectional view of the liquid drop detector according to the present invention under the condition of being attached on a front windshield of the automobile.

A front windshield G of an automobile is constructed or formed by uniting an inside glass plate G1 and an outside glass plate G2 through an intermediate film C, and in particular in an upper peripheral portion of the front windshield G is formed a shaded pattern Gr. This shading pattern Gr is provided between the inside glass plate G1 and the outside glass plate G2, being applied upon the intermediate film C.

A liquid drop detector 1 according to the present invention is provided on an interior (G1) side surface of the windshield G at a position where it is hidden by a rear-view mirror M, in a portion where the shading pattern Gr is provided on the front windshield G.

The liquid drop detector 1 is constructed with a plurality of elements being received within a case 2, and the case 2 comprises a base 2a of aluminum or resin, which is attached on the interior side surface of the front windshield G through an adhesive sheet 3, and a cover 2b which is fixed onto the base 2a by screws.

The cover 2b may be fixed onto the base 2a at positions of both sides thereof in the longitudinal direction, or may be fixed at only the one side by a screw while inserting or interlocking the other side thereof in it in such a condition that it is free in the longitudinal direction, thereby enabling the device to move to accommodate expansion due to changes in temperature.

Further, a holder 2c is fixed between the base 2a and the cover 2b, which holds a light emitting element 4 emitting a light beam of wavelength from 700 nm to 780 nm at one end in the longitudinal direction thereof while a light receiving element 5 is provided at the other end thereof. Between the base 2a and the holder 2c is provided a light guiding means 6 for guiding or introducing the light beam emitted from the light emitting element 4 into the light receiving element 5.

The light guiding means 6 comprises a light guiding body 7 made of glass, upon which the light beam emitted from the light emitting element 4 is incident, a light guiding body 8 made of glass, which makes the light beam incident upon the light receiving element 5, a light guiding body 9 made of glass, which is positioned so as, at each end thereof, to overlap light guiding bodies 7 and 8 respectively, and further silicon members 10 . . . which lie between the light guiding bodies 7 and 8 and the light guiding body 9 and also between the light guiding body 9 and the interior side surface of the front windshield G.

Each of silicon members 10 is made from an elastic body having a refractive index being almost equal to those of the light guiding bodies 7, 8 and 9 as well as the front windshield G, and has thickness being selected in such manner that it is partially compressed in its shape under the condition where the cover 2b is attached to the base 2a, thereby allowing no air layer to remain between the light guiding bodies 7, 8 and 9 and the silicon members 10, nor between the front windshield G and the silicon members 10.

In explanation, if there remains any air layer in the portions mentioned above, the light beam will not penetrate therethrough but rather undergoes total internal reflection, thereby bringing about such a result that the light beam from the light emitting element 4 does not reach the front windshield G, or the light beam undergoing total internal reflection within the front windshield G does not reach the light receiving element 5.

For the same reason as mentioned above, further silicon members 10 lie between the light receiving element 5 and the light guiding body 9, said silicon members having such a thickness that they are partially compressed in thier shape when assembled, preventing any air layer as discussed above from existing between them. In place of the silicon members 10, a non-volatile liquid may be applied, which has the refractive index being almost equal to those of the light guiding bodies 7, 8 and 9 and the front windshield G.

As mentioned in the above, since the light guiding bodies 7 and 8 are provided separately, a space 11 is formed in a central portion therebetween. However, there can be considered a possibility of moisture condensation within the space 11, therefore it is preferable to enclose a desiccant therein.

Further, reflection films 14 made of thin metal film are provided in appropriate positions on the surfaces of the light guiding bodies 7, 8 and 9. It is not always required that reflection films 14 be thus provided, though, in particular when the light beam is incident upon at such an angle that it experiences the total internal reflection therein.

A diffraction grating 15 is provided upon the upper surface of the light guiding body 7. This diffraction grating 15 is provided for the purpose of introducing the light beam from the light emitting element 4 into the light guiding body 7 at a predetermined angle, as well as for reflecting a portion of the light beam from the light emitting element 4 onto a light receiving element 16, for use in monitoring.

It can be consider as a method for manufacturing the diffraction grating 15 to employ the ablation phenomenon by evaporating a portion of the glass surface by means of a laser beam.

The ablation is a phenomenon occurring due to absorption of light energy of the laser beam by the glass. When silver is contained in forms of Ag atoms, Ag colloid, and/or Ag ions to a predetermined depth at the surface of the glass substrate, and further the concentration of silver comes to be at a maximum at the surface to be machined by laser and has an concentration gradient gradually decreasing toward the predetermined depth, then the ablation phenomenon occurs sequentially, directing from the surface potion to an inside thereof, thereby enabling microscopic machining without cracking nor fragments being formed therein.

In the above, the light emitted from the light emitting element 4 is guided or introduced into the light guiding body 7 through the diffraction grating 15, and after experiencing total internal reflection within the light guiding body 7, it is guided into the front windshield G, penetrating through the silicon member 10 which contacts directly with the light guiding body 7 and has the diffraction index being equal thereto, and through the light guiding bodies 9, the silicon member 10 positioned between the light guiding bodies 9 and the front windshield G.

The light being guided into the front windshield G, after repeatedly undergoing total reflection within the front windshield G, is received by the light receiving element 5 through the silicon member 10 positioned between the light guiding bodies 9 and the front windshield G, the light guiding bodies 9, the silicon member 10 positioned between the light guiding bodies 9 and the light guiding bodies 8, and the light guiding bodies 8.

In this instance, when raindrops adhere on the outside surface of the front windshield G and the adhering points are at the total internal reflection points of the light mentioned above, then the light beam guided into the front windshield G passes through and exits from the windshield toward the outside, without experiencing the total internal reflection therein. As the result of this, the amount of the light beam received by the light receiving element decreases, thereby enabling detection of adhesion of raindrops, so as to output a signal for driving a wiper equipment or the like.

As is mentioned in the above, according to the present invention, with use of the light beam of wavelength from 700 nm to 780 nm as the detection light for the liquid drop detector which is applied to automobiles, the detection light does not obstruct the driver, and since the absorption thereof in the glass and in the shaded portion thereof is only small in degree, the sensitivity is therefore improved.

What is claimed is:

1. A liquid drop detecting method, comprising steps of:

introducing a light beam emitted from a light emitting means into a glass plate such that it undergoes total internal reflection therein; and detecting presence of liquid drops adhering upon said glass plate by detecting the light beam undergoing total internal reflections on both inner surfaces within said glass plate, wherein a wavelength of the light beam emitted from said light emitting means is selected to be from 700 nm to 780 nm.

2. A liquid drop detecting apparatus, comprising:

light emitting means for emitting a light beam;

a glass plate, into which the light beam emitted from said light emitting means is introduced to undergo total internal reflection therein; and light receiving means for detecting the light beam undergoing total internal reflection on both inner surfaces within said glass plate, wherein a wavelength of the light beam emitted from said light emitting means is selected to be from 700 nm to 780 nm.

3. A liquid drop detecting apparatus as defined in claim 2, wherein said liquid drop detecting apparatus is attached at a portion of an interior side surface of a front windshield of an automobile, where a shading pattern is formed therein.

* * * * *